Oct. 27, 1970  T. W. ASTLE  3,536,449
SERIAL DILUTION MACHINE
Filed April 13, 1967  6 Sheets-Sheet 3

INVENTOR
Thomas W. Astle
BY
Lane, Aitken, Dunner & Ziems
ATTORNEYS

Oct. 27, 1970  T. W. ASTLE  3,536,449
SERIAL DILUTION MACHINE
Filed April 13, 1967  6 Sheets-Sheet 4

INVENTOR
Thomas W. Astle
BY
Lane, Aitken, Dunner + Ziems
ATTORNEYS

INVENTOR
Thomas W. Astle
BY Lane, Aitken, Dunner & Ziems
ATTORNEYS

Oct. 27, 1970 — T. W. ASTLE — 3,536,449
SERIAL DILUTION MACHINE
Filed April 13, 1967 — 6 Sheets-Sheet 6

INVENTOR
Thomas W. Astle
BY Lane, Aitken, Dunner + Ziems
ATTORNEYS

United States Patent Office 3,536,449
Patented Oct. 27, 1970

3,536,449
SERIAL DILUTION MACHINE
Thomas W. Astle, 607 Harbor View Road,
Orange, Conn. 06477
Filed Apr. 13, 1967, Ser. No. 630,621
Int. Cl. B65b 3/04, 37/20; G01n 1/18
U.S. Cl. 23—230    24 Claims

ABSTRACT OF THE DISCLOSURE

A serial dilution machine which automatically performs serial dilutions of a liquid material such as human serum and adds to these dilutions a test material to determine the highest dilution which will cause a certain effect. The serial dilution machine includes a transport assembly which moves over a tray containing the liquid. The transport assembly includes means for withdrawing a predetermined volume of liquid to be diluted from one portion of the tray while simultaneously placing a buffer solution in another tray portion and means for transferring such liquid to said other tray portion. The transport assembly also includes means for delivering predetermined amounts of testing material into the diluted liquid. A burner assembly is provided to flame clean the apparatus to sterilize it prior to the next run. Also disclosed is a novel tray formed of a plurality of rows of holes and which can be stacked on top of a similar tray when the holes are filled with liquid and which can be nested into a similar tray when they are not in use for storage or shipping.

BACKGROUND OF THE INVENTION

The present invention relates to laboratory testing equipment and more particularly to a serial dilution machine to automatically perform various medical tests that require serial dilutions of one component in known amounts of another component. A number of medical laboratory tests require serial dilutions to determine the highest dilution which will cause a certain effect. These tests are now done by time consuming manual methods wherein the liquid to be diluted is placed in a fixed amount of buffer solution in sequential steps every time an additional dilution is made. After the required dilution ratio is obtained, fixed amounts of material to be tested are manually mixed with the diluted liquid and the results are observed for each stage of dilution. The fixed amount of liquid to be diluted and testing material are conventionally obtained and mixed by titrator loops which are adapted to pick up and hold a predetermined amount of liquid material. With this arrangement, each time a dilution step or an addition of testing material is made the titrator loops must be manually placed into the liquid to be diluted or the testing material and subsequently mixed in a second liquid solution. When a particular test requires a large dilution ratio the test becomes extremely time consuming. Other laboratory serial dilution tests employing a syringe or mouth pipette for carrying the liquid solutions in lieu of titrator loops also require that the tests be manually performed in the same manner as described above.

With the manual testing methods outlined above, test results are often inadequate because of the human error involved in removing and mixing exact amounts of liquid to form the dilution. Furthermore since human contact is necessary, problems of sterility arise.

Automatic serial dilution machines have been developed but they generally perform dilutions only and require previously supplied and measured amounts of buffer diluent and previously supplied and measured amounts of testing material. A further disadvantage of serial dilution machines of this type is that they are generally structurally complicated and tend to take up valuable laboratory space.

SUMMARY OF THE INVENTION

The present invention provides an apparatus for automatically making serial dilutions and simultaneously performing tests using the dilutions wherein the above-mentioned disadvantages are eliminated. The serial dilution apparatus is adapted to dilute exact amounts of liquid to form a first dilution while simultaneously providing an exact amount of buffer solution for a succeeding dilution. These steps are automatically and sequentially performed until the desired dilution ratio is obtained. The invention includes apparatus for simultaneously adding a predetermined amount of material to be tesed to the diluted solution as additional dilutions are being made in succeeding steps. The serial dilution machine includes a sterilizing means at the end of a testing cycle for preparing the dilution apparatus for subsequent tests.

It is accordingly a primary object of the present invention to provide a novel serial dilution machine wherein serial dilutions are automatically made and testing of material in the serial dilutions are simultaneously performed.

It is a further object of the present invention to provide an apparatus for automatically obtaining a predetermined amount of liquid solution to be diluted and mixing it with a predetermined amount of buffer solution to provide an exact dilution ratio.

It is still another important object of the present invention to provide a serial dilution apparatus which will automatically and simultaneously perform serial dilutions, laboratory tests and prepare the apparatus for subsequent use at the end of the test cycle.

It is still another further object to provide a flame cleaning apparatus for use with a serial dilution apparatus to sterilize the dilution apparatus after a dilution cycle is complete preparatory to beginning another cycle.

It is still a further object of the present invention to provide a novel serial dilution tray which is particularly adapted to be stacked on like trays without interfering with the contents of the latter while being nestable within such trays to facilitate their storage and shipping.

These and further objects and advantages of the present invention will become more apparent through a reference to the following description and appended claims as well as to the accompanying drawings described below.

DESCRIPTION OF THE PREFERRED EMBODIMENTS

Figure 1:
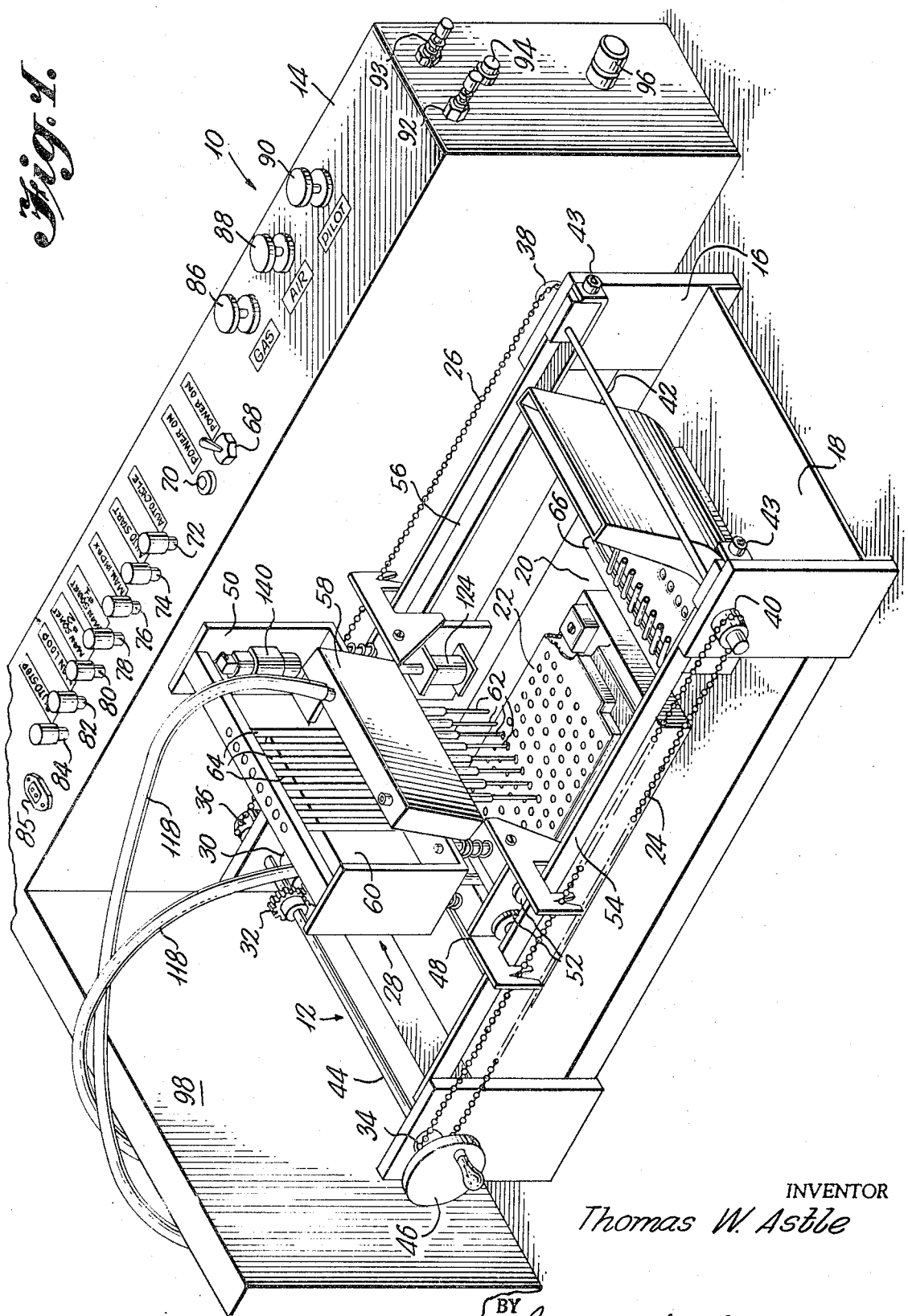
FIG. 1 is a perspective view of the serial dilution machine of the present invention.
Figure 2:
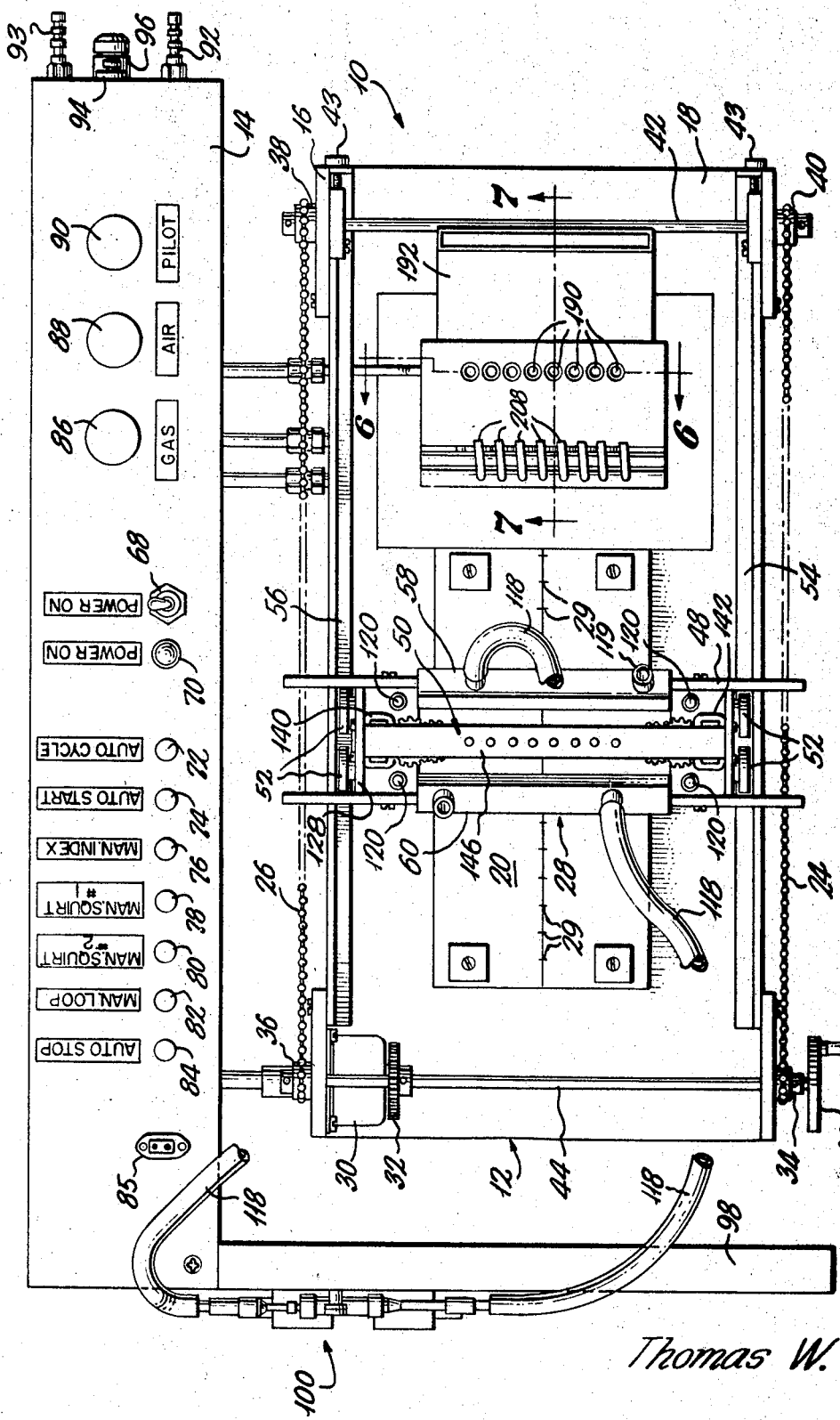
FIG. 2 is a plan view of the serial dilution machine of FIG. 1.

The serial dilution machine 10 illustrated in FIGS. 1 and 2 comprises a diluting and testing section 12 and a control housing 14. The diluting and testing section includes a frame assembly 16 having a flat base 18. The base is provided with a testing platform 20 to secure and position a tray 22 which contains the liquid solutions to be diluted and tested. The frame assembly 16 includes two endless loop drive chains 24 and 26 disposed at opposite sides of the frame for indexing a transport section 28 by means of a rotary solenoid 30 having detents for determining its stopping position. Various indexing positions 29 are marked on the testing platform 20. To insure that the transport section 28 is driven straight and not cocked, it is driven from both sides by the chains 24 and 26 which are driven by the rotary solenoid 30 through a gear mechanism 32. Drive sprockets 34, 36, 38 and 40 are coupled by cross shafts 42 and 44 which are mounted by ball bearings to the frame assembly 16. Set screws 43 are provided to keep the chains 24 and 26 tight. A handle 46 is provided to manually drive the chain if desired.

The transport section 28 comprises a carriage assembly 48 and loop drive assembly 50. The transport section 28 includes rollers 52 which ride in two tracks 54 and 56 on the frame assembly 16 and is driven by the chains 24 and 26 over the tray 22 in which material is to be deposited and tested. The carriage assembly 48 includes two manifold containers 58 and 60 which are designed respectively to accommodate liquid buffer solution and liquid material to be tested. Each manifold container includes a plurality of hypodermic needles 62 which deposit the buffer solution and material to be tested into the holes on the tray 22. Mounted between the two manifold containers 58 and 60 on the carriage assembly 48 is the loop drive assembly 50 which is designed to carry a plurality of titration loops 64 which transport the liquid to be diluted from one row of holes on the tray 22 to a succeeding row of holes.

A flaming unit 66 is provided which consists of eight small burners arranged to clean and sterilize the titration loops 64 at the end of a testing cycle.

The control housing 14 is provided with an on-off power switch 68 and a pilot lamp 70 to indicate whether or not the power is on. A number of push button electrical switches 72, 74, 76, 78, 80, 82 and 84 are provided which regulate the atuomatic and manual control operations of the serial dilution machine. A power outlet 85 is provided on the control housing 14 when an auxiliary power source is required. The gas and air are supplied to the burner unit 66 through needle valves 86, 88 and 90 which are adjustable. The end of the control panel housing 14 is provided with gas and air inlets 92 and 93. Push button 94 is provided to manually actuate the gas supply means to the flaming unit. The serial dilution machine 10 is fused against overload by a line fuse mounted in fuseholder 96.

The end wall 98 attached to the control housing 14 acts as a mount for the squirter assembly 100 which will be described hereinbelow in greater detail.

Figure 3:
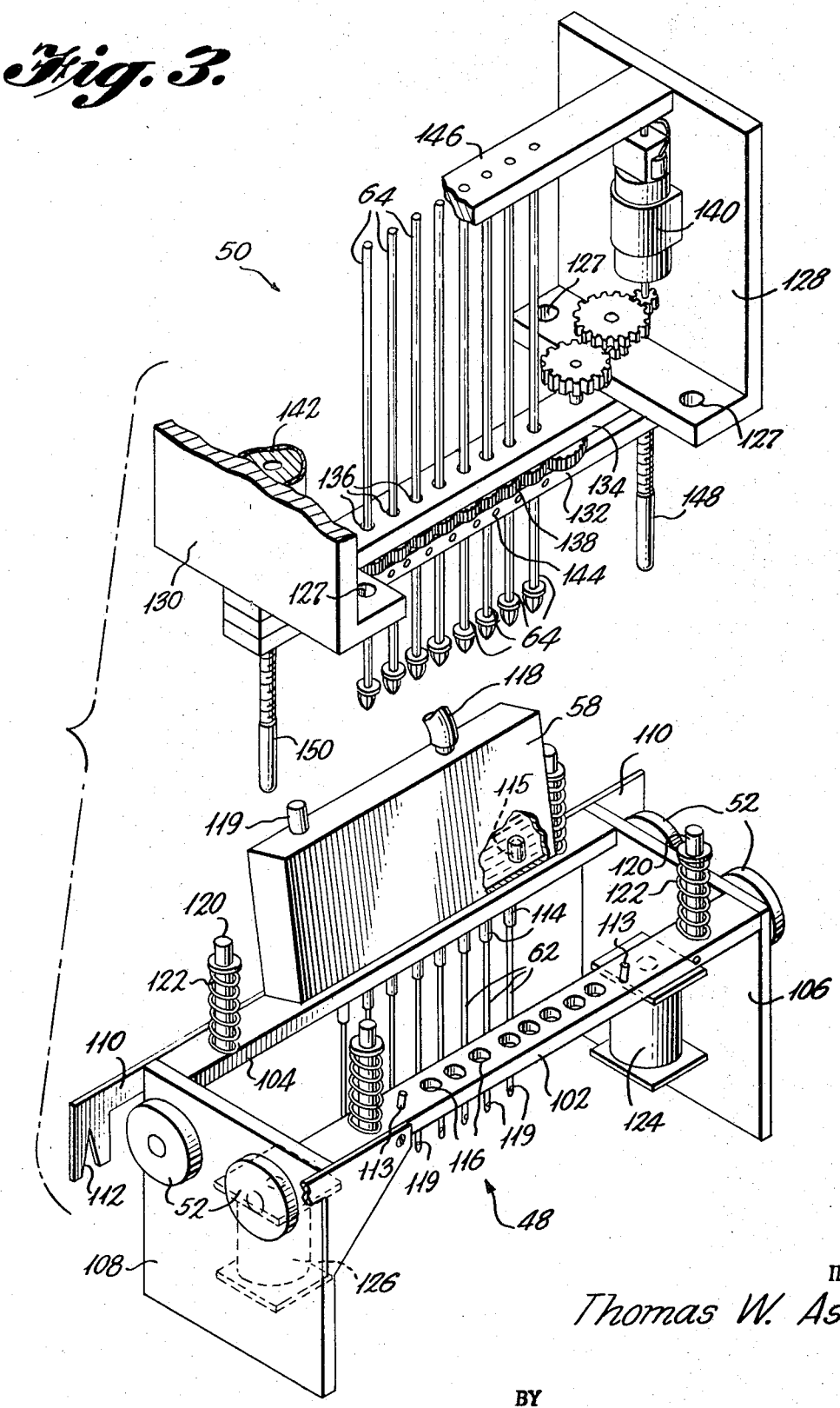
FIG. 3 is an exploded view of a portion of the apparatus of FIG. 1.

FIG. 3 illustrates the carriage assembly 48 and the loop drive assembly 50 in greater detail. The carriage assembly 48 is desgined for easy removal to facilitate cleaning, inspection and maintenance by merely lifting it off the carriage tracks 54 and 56 on the frame assembly 16.

A pair of elongated supporting struts 102 and 104 are attached to the end plates 106 and 108 to complete the carriage assembly frame. The carriage assembly 48 is driven by an L-shaped element 110 which includes a V-shaped notch 112 adapted to fit over and engage the chain drives 24 and 26. The front manifold container 58 is shown attached to the front horizontal strut member 104 by two pins 113 which fit into complementary holes 115.

This arrangement permits easy removal and rapid interchangeability of the manifold containers from the carriage assembly 48. Tubular extensions 114 extend from the manifold container 58 which are adapted to hold the hypodermic needles 62 and which fit into holes 116 in the struts 102 and 104. A second manifold container identical to manifold container 58 shown as 60 in FIGS. 1 and 2 is placed on the rear horizontal strut 102 in the same manner as the front manifold container 58, shown in FIG. 3. For sake of clarity, this manifold container 60 is not illustrated in this drawing. The manifold containers 58 and 60 are hollow and are adapted to retain solutions which are supplied from the squirter assembly 100 through the tubing 118. An air bleed orifice 119 is also provided at the top of each of manifold containers 58 and 60. The manifold containers are designed so that the pressure head loss is all in the hypodermic needles 62 they feed. In this manner, each needle 62 will deliver the same amount of liquid into the holes in the tray when the squirter assembly 100 is actuated. The calibration of each needle 62, if necessary, is accomplished by changing its length slightly to change the pressure drop of the individual needle 62 relative to the others. A small needle size (preferably 22 gauge) is used to eliminate air going back up into the system between squirts. Since a bubble or air pocket in a hypodermic needle 62 would alter flow, the entire fluid system is designed for easy air removal at the start of the cycle and designed to prevent subsequent air entry into the needles 62 during operation. Minute holes 119 are drilled adjacent the openings of needles 62 to prevent drops of liquid from adhering to the bottom of the needles 62 by releasing surface tension at that point.

The carriage assembly 48 includes four posts 120 supported at each end of the two horizontal struts 102 and 104. Each post 120 is provided with a spring mounted washer assembly 122 which is adapted to receive the loop drive assembly 50 as described hereinbelow in greater detail. Two solenoids 124 and 126 are located on the carriage assembly side plates 106 and 108. The solenoids 124 and 126 when energized pull the loop assembly 50 down to immerse titration loops 64 in the diluted liquid which is carried in the tray 22. When the solenoids 124 and 126 are deenergized the springs 122 lift the loops 64 away from the tray 22.

The loop drive assembly 50 is designed to be used either manually as a hand-held unit or automatically on the serial dilution machine. It rides on posts 120 of the carriage assembly 48 in holes 127 formed in the end plates 128 and 130. To remove the loop drive assembly from the machine, it is merely lifted up off posts 120 of the carriage assembly 48.

Loop drive assembly 50 comprises two lower horizontal strut members 132 and 134 which are attached to the end plates 128 and 130. The strut members 132 and 134 are provided with a plurality of holes 136 designed to accommodate the titration loops 64. A gear train 138 mounted between the horizontal struts 132 and 134 is operably connected to a pair of D.C. drive motors 140 and 142 attached to the end plates 128 and 130 of the loop drive frame. Each gear wheel in gear train 138 is provided to accommodate a titration loop 64 which is placed through a hole in the center of the gear and secured therein by means of a set screw (not shown). Holes 144 are provided on the lower horizontal strut 132 for access to the set screws. The left-hand end plate 130 and an upper horizontal strut 146 are shown broken away in the drawing for clarity. Two vertical posts 148 and 150 are attached to the lower horizontal strut member 132. The lower portions of the posts 148 and 150 act as the cores for the solenoids 124 and 126 mounted on the carriage assembly 48.

When it is desired to use the loop drive assembly 50 for manual serial dilutions, the assembly 50 may be held by the upper horizontal strut 146 which is adapted to include a means (not shown) for plugging into a D.C.

outlet for power and includes a push button (not shown) to energize the loop motors 140 and 142.

Figure 4:
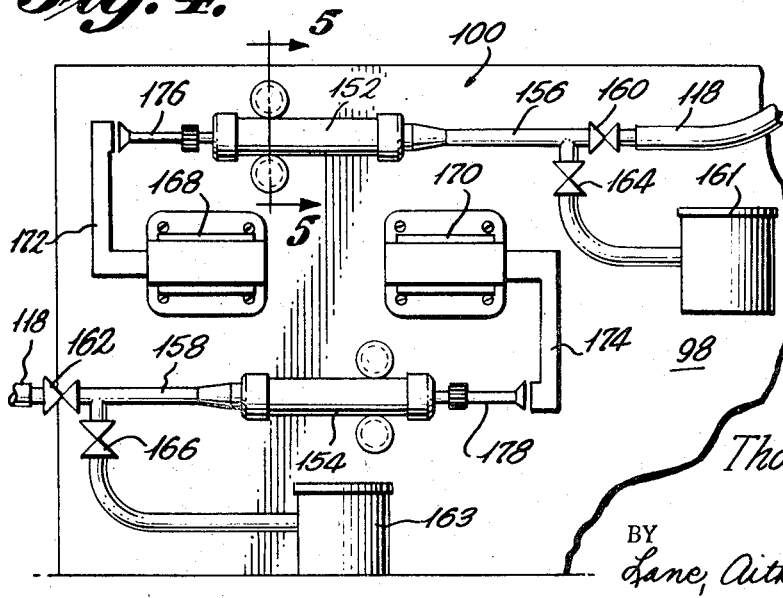
FIG. 4 is a view of another portion of the apparatus of FIG. 1.
Figure 5:
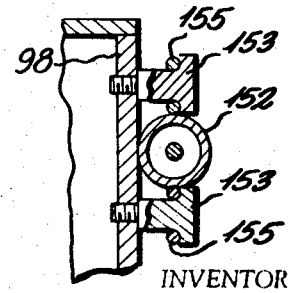
FIG. 5 is a transverse section taken along line 5—5 of FIG. 4.

FIGS. 4 and 5 illustrate the squirter assembly 100 which is mounted to the end wall 98 of the serial dilution machine 10. A pair of squirters are provided in the form of continuous syringe pipettes 152 and 154. The outlets 156 and 158 of each pipette syringe is coupled to tubing 118 which leads to the manifold blocks 58 and 60 through spring loaded one-way check valves 160 and 162. The supply of buffer solution or material to be tested is provided from supply bottles 161 and 163 to the pipette syringes 152 and 154 through a second pair of one-way valves 164 and 166. Mounted in juxtaposition with the syringe pipettes are solenoids 168 and 170 having L shaped actuating armatures 172 and 174 adapted to depress the plungers 176 and 178 of the pipette syringes 152 and 154 when either or both are energized. This forces a predetermined amount of buffer solution or material to be tested into the respective manifold container through tubing 118. When the solenoids 168 and 170 are deenergized and the pipette plungers 176 and 178 are spring returned, supply liquid is sucked from the supply bottles 161 and 163 into the syringes 152 and 154 through the one-way valve assemblies 164 and 166 for the next stroke.

FIG. 5 illustrates the apparatus provided to mount the syringes, including a pair of mounting screws 153 which fit through the finger rings 155 of the syringes and screw into the end wall 98 of the machine 10.

Figure 6:
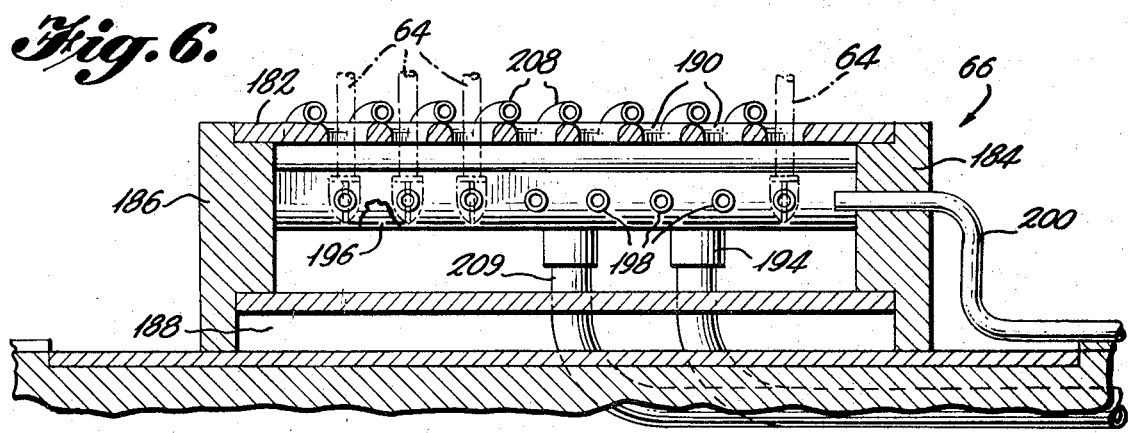
FIG. 6 is a transverse section taken along line 6—6 of FIG. 2.
Figure 7:
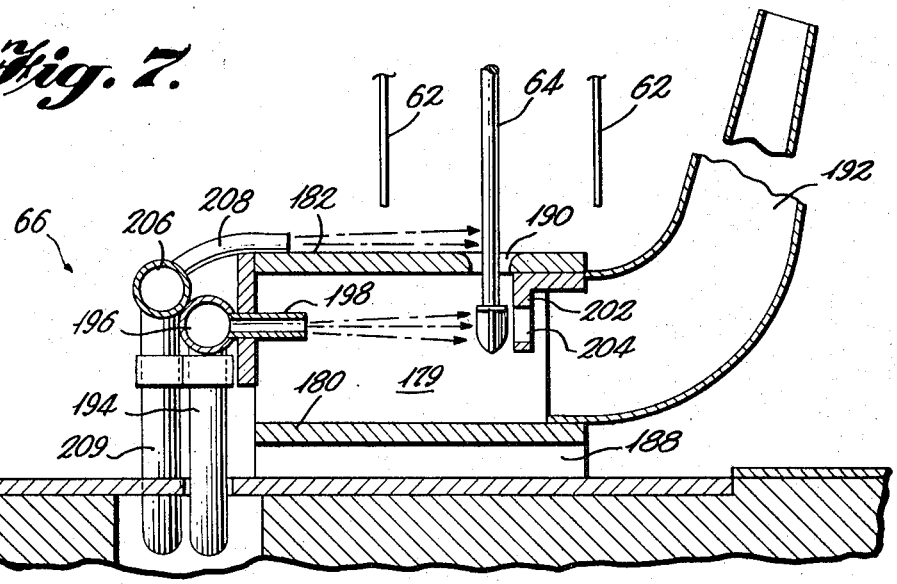
FIG. 7 is a transverse section taken along line 7—7 of FIG. 2.

FIGS. 6 and 7 illustrate the flaming assembly 66 which is used to sterilize the titration loops 64 at the end of each cycle. Each loop must be heated to a red color (approximately 1500° F. to 2000° F.) to properly sterilize the loops. This must be done in as short a time as possible and without overheating the needles 62 of the hypodermic syringes that are used to supply buffer and test material solutions since such needles are within one half inch of each loop. A burning chamber 179 is formed by an insulating base 180 and top 182 which are attached to end wall sections 184 and 186 of the assembly. An air space 188 is provided below the insulating base 180 to facilitate cooling. The insulating top 182 is provided with a plurality of holes 190 corresponding to the number of titration loops 64 which are to be cleaned and sterilized. A copper chimney 192 is provided at the down flame side of the flaming assembly 66 to direct the heat and combustion materials away from the machine 10. A mixture of combustible gas and air is supplied through inlet pipe 194 to a burner manifold 196 which includes a plurality of nozzle jets 198 adapted to direct a flame into the burning chamber 179 at each of the loops 64 as they are lowered through the holes 190 in the insulating top 182. The mixture of gas and air is separately controlled by means of the needle valve assemblies 86 and 88 on the control panel 14. A pilot flame burner 200 is provided to ignite the combustible mixture as it passes through the nozzles 198. The flow of combustible material is solenoid actuated to correspond with the time that the titration loops 64 are lowered into the flaming position. A baffle 202 is provided behind the loops in the flame path. The baffle 202 performs two functions: (1) it blocks enough gas at the start of a burning cycle to insure ignition of all of the nozzles from the single pilot, and (2) it directs the flame around the loop more completely by allowing the flame to escape through holes 204 in the baffle 202 directly behind the loop.

A second manifold 206 is provided above the burning chamber 179 having a plurality of jet nozzles 208 which direct a cooling air stream from an inlet pipe 209 across the needle tips 62 which hold the buffer solution and the material to be tested. This cooling prevents a chemical breakdown of these solutions. When the burner assembly 66 is on, this air stream tends to force a draft on the flame around the loops 64 to provide a hotter flame. When the burner shuts off and the loops 64 are withdrawn, the air stream cools the loops down so that they may be withdrawn and the next cycle started. The air stream also dissipates the heat generated by the pilot flame and cools the copper chimney 192.

As an alternative to the flaming assembly described above, a washing assembly (not shown) to clean the loops at the end of the cycle may be provided. With this apparatus the loops will be immersed in a running stream of water and when they are withdrawn an air stream will dry them prior to the next cycle.

Figure 8:
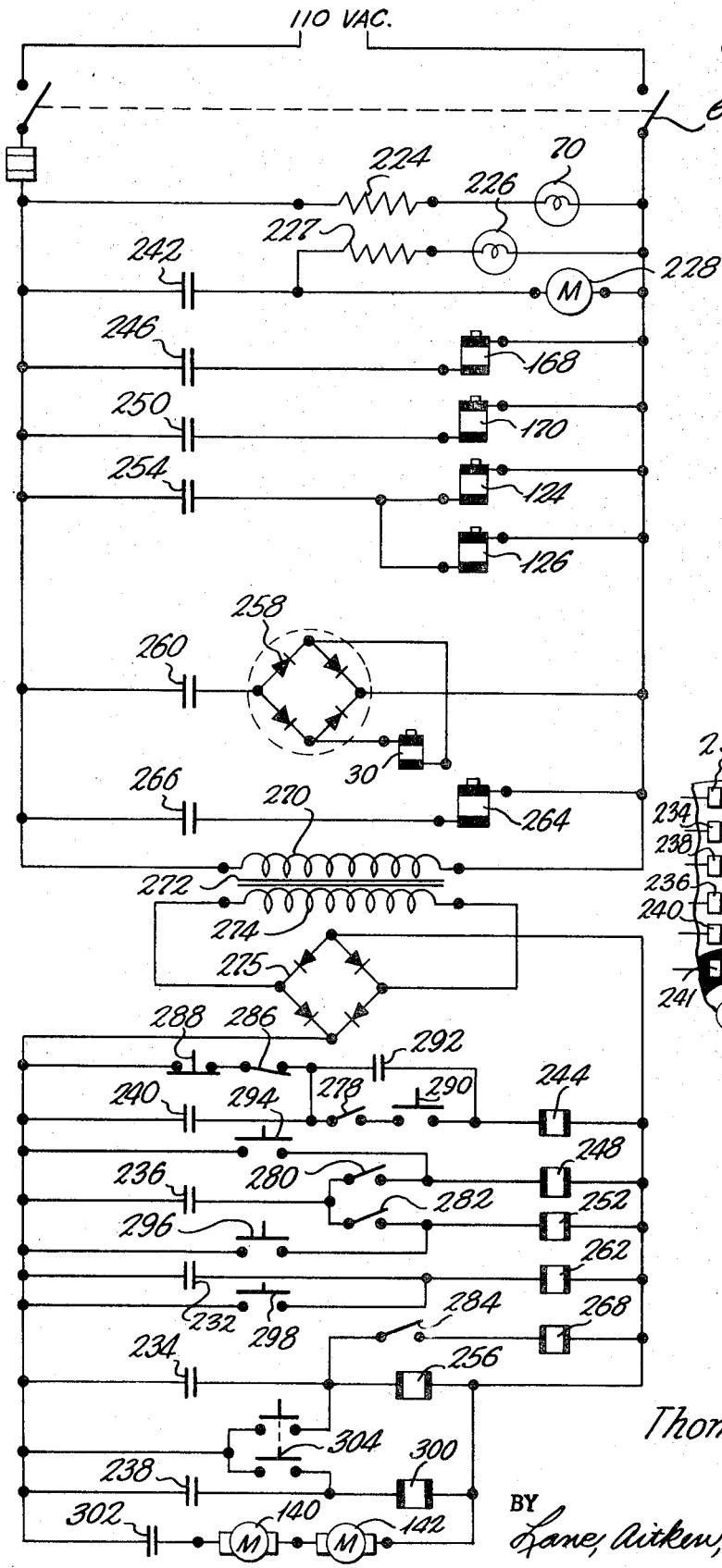
FIG. 8 is a schematic diagram of the control circuit of the present invention.
Figure 9:
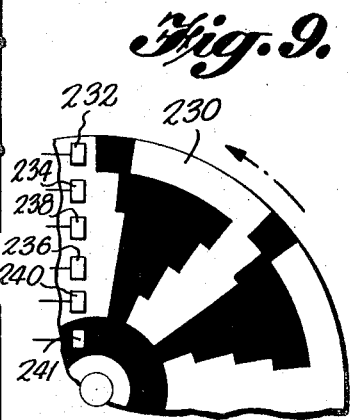
FIG. 9 is a partial view of part of the control apparatus.

The control circuit for operating the serial dilution machine is illustrated in FIG. 8. The circuit is connected to a 110 volt A.C. source of supply. The main power on-off switch 68 is connected across the line in parallel with a pilot lamp 70 in series with resistor 224. A cycle-on lamp 226 is connected in series with resistor 227 and in parallel with a synchronous clock motor 228, connected to the A.C. supply. The motor 228 drives a control disc 230, illustrated in FIG. 9, which rotates at 1 r.p.m. A printed wiring circuit is etched upon the surface of the control disc 230 in such a manner so that as it revolves in the direction shown by the arrow carbon brush switches 232, 234, 236, 238 and 240 which are positioned in front of the disc 230 make and break electrical contact at different times in the cycle of rotation of the control disc 230 according to the printed circuit pattern. An electrical circuit is completed between any of the brush switches, the printed circuit pattern and contact 241 which permanently rides on a conductive portion of the printed circuit pattern. The synchronous clock motor 228 is connected in series with a contact 242 of a run relay 244. Squirt solenoids 168 and 170 and the loop lowering solenoids 124 and 126 are also connected to the A.C. supply. Squire solenoid 168 is connected in series with a contact 246 of squirt relay 248 and squirt solenoid 170 is connected in series with a contact 250 of squirt relay 252. Loop lowering solenoids 124 and 126 are both connected in series with a contact 254 of loop lowering relay 256. A full wave bridge rectifier 258 is connected in series with a contact 260 of indexing relay 262. The rotary indexing solenoid 30 is connected across the output of the full wave bridge 258. Also connected across the A.C. supply is a gas solenoid 264 which operates to supply gas to the flaming assembly 66. Gas solenoid 264 is connected in series with a contact 266 of gas relay 268. The primary 270 of a step down A.C. transformer 272 is connected to the A.C. supply source. The secondary 274 is coupled to a full wave bridge rectifier 275 which produces a 5 volt D.C. output.

Since all the indexing positions that correspond to holes in the tray 22 do not require the same function, for example, the second manifold block 62 and squirting syringe 154 is not actuated when the loops 64 are in the first row of holes, it is necessary to add logic determining what row of holes is being serviced. This is accomplished by means of a number of cam operated microswitches 278, 280, 282, 284 and 286. These microswitches are driven by a cam assembly (not shown) which is rotated by the rotary indexing solenoid 30 that is used to drive the transport section 28. Start limit switch 278 is closed when the transport section 28 is in the first indexing position and is open in all other positions. Squirt limit switch 280 is open in indexing positions at the flaming assembly position and is closed in all others. Squirt limit switch 282 is open in the first two indexing positions and at the flaming assembly position and is closed in all others. Gas limit switch 284 is actuated at the flaming assembly position and open in all others. The stop limit switch 286 is closed in all positions except at the end of the cycle when the transport assembly is at the flaming assembly position.

The run relay 244 is connected in series with a circuit loop consisting of cycle stop switch 288, stop limit switch 286, brush switch 240, start limit switch 278, cycle start switch 290 and run relay contact 292. Brush switch 236 is connected in series with squirt relay 248 and squirt limit switch 280 and in series with squirt relay 252 and squirt limit switch 282 across the D.C. power supply.

Manual squirt switches 294 and 296 are provided so that squirt relays 248 and 252 may be energized when brush switch 236 or squirt limit switches 280 or 282 are in their open positions. Indexing relay 262 is connected in series with brush switch 232 across the D.C. supply. A manual index switch 298 is also provided to energize index relay 262 when brush 232 is in the open position. Gas relay 268 is connected in series with gas limit switch 284 and brush switch 234. The loop lowering relay 256 is also connected in series with brush switch 234 across the D.C. supply source. Motor relay 300 is connected in series with brush switch 238 across the D.C. supply while the loop drive motors 140 and 142 are connected in series with a contact 302 of the motor relay 300. A manual switch 304 is provided to energize the loop lowering relay 256 and the motor relay 300 when the brush switches 234 and 238 are out of the circuit during the manual operation of the diluting apparatus.

It will be appreciated that switches 288, 290, 294, 296, 298 and 304 correspond to and are actuated by push buttons 74, 76, 78, 80, 82 and 84 on the control housing 14.

Figure 10:
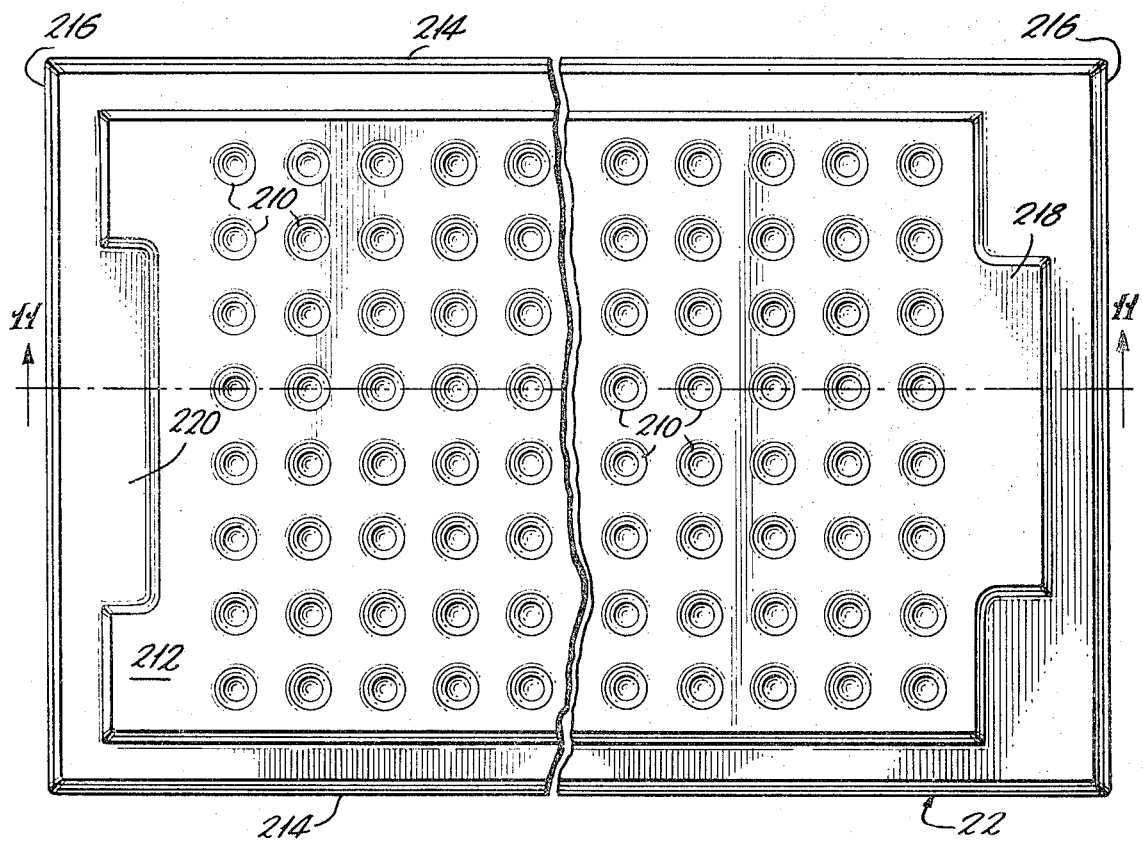
FIG. 10 is a plan view of the tray used with the apparatus of the present invention.
Figure 11:
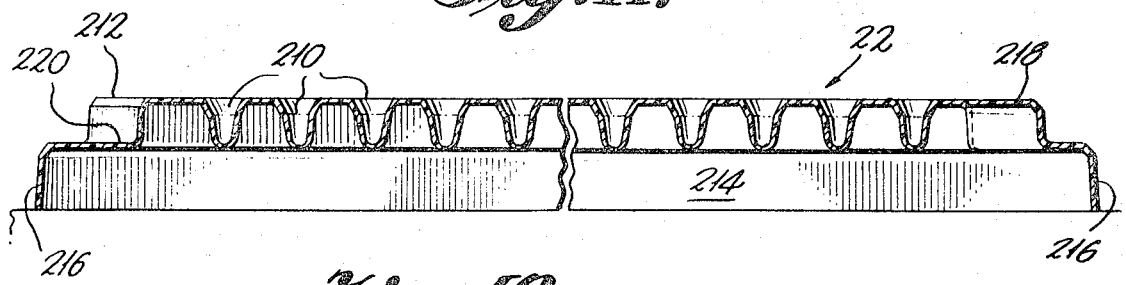
FIG. 11 is a transverse section along line 11—11 of FIG. 10.
Figure 12:
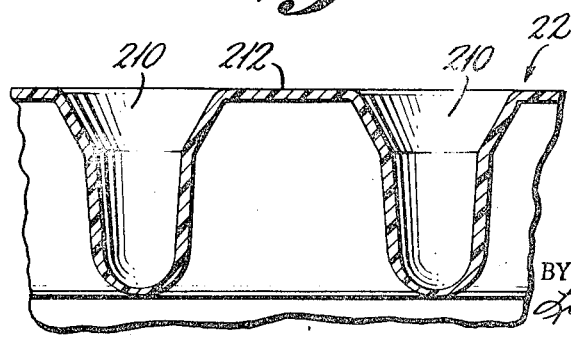
FIG. 12 is an enlarged sectional view of a portion of the apparatus of FIG. 10.

FIGS. 10, 11, and 12 illustrate a disposable tray 22 adapted for use with the serial dilution machine 10. The tray 22 is preferably formed of a plastic material by being die-pressed or the like and it is designed so that it may be either nested into or stacked upon similar trays. The tray is a flat hollow container having a plurality of rows of holes 210 which are formed in the tray surface 212 by pressure means. The tray surface 212 is supported by means of flat sides 214 and end walls 216 which slope outwardly at a constant angle which provides just enough draft so that a number of trays can be nested into each other.

One end of the tray 22 is provided with a rectangular ledge portion 218 while the opposite end is provided with a rectangular recess 220 of a different dimension. With this configuration, when the trays 22 are aligned with each other so that the ledge portions 218 and recess portions 220 both face in the same direction, they will nest into one another to form a compact package. This facilitates shipping and reduces storage space. When the ledges 218 and recesses 220 of the trays 22 are oppositely disposed to each other, the ledge portion 218 will overlap the recess portion 220 because of the difference in configuration and the trays 22 will not nest into each other. Thus the trays 22 may be filled and stacked on top of one another without disturbing the liquid in the holes 210.

One of the features of the tray 22 is that when several trays are filled with the materials necessary for the biological tests for which the trays were designed, the top tray will act as an effective vapor barrier to the trays underneath, thereby protecting the contents of the lower tray from contamination and evaporation which would result in distortion of the test results.

The operation of the serial dilution machine may be described as follows: A titration tray 22 of the type described above is placed on the testing platform 20 in the serial dilution machine 10. In the embodiment shown, the tray 22 has 8 rows of holes across its width and 15 rows of holes across its length, for a total of 120 holes. The first series of holes in the tray are filled by a technician with a liquid to be diluted, which, for purposes of this description, will be assumed to be a serum. The quantity of serum placed in each of said first series of holes is not critical and need not be measured. The machine is then connected to the A.C. source of supply by means of the power switch 68. If the transport assembly 28 is in the first indexing position, the cycle start limit switch 278 will be closed so that with the cycle start switch 290 depressed the run relay 244 will become energized. Run relay contact 292 then closes and shunts the cycle start switch 290. Run relay contact 242 also closes and completes the circuit to the synchronous clock motor 228 which drives the control disc 230 to sequentially energize brush switches 232, 234, 236, 238 and 240, completing their respective circuits. Brush switch 232 completes a circuit through the indexing relay 262 which in turn closes its contact 260 causing the index solenoid 30 to move the transport assembly one position. Brush switch 234 then energizes the loop lowering relay 256 whose contact 254 energizes the lowering solenoids 124 and 126 which lowers the loops 64 into the holes into which the serum to be diluted has been placed. Brush switch 236 also closes and with squirt limit switches 280 and 282 closed, the squirt relays 248 and 252 will close to complete a circuit through the squirt solenoids 168 through the squirt relay contacts 246 and 250. When the squirt solenoids 168 and 170 are actuated their armatures 172 and 174 depress the plungers 176 and 178 of the continuous syringe pipettes 152 and 154. This forces a predetermined amount of solution out of the syringes through one-way valves 160 and 162 to the respective manifold containers. With the transport assembly 28 indexed at the first operating position, only manifold 58 is over a series of holes in the tray 22 and the squirt limit switch 282 is opened so that squirt solenoid 170 is not energized. Thus only squirt solenoid 168 operates the continuous syringe pipette 152 to add a measured quantity of buffer solution to the second series of holes in the tray at the same time the loops 62 are immersed in the liquid in the first series of holes. At subsequent operating positions squirt limit switch 282 is closed and the syringe pipette 154 operates to add testing material to the manifold container 60.

For example, assuming that the loops carry 0.05 milliliter and the first hole has 100% serum, the loops would then transport 0.05 milliliter of serum and mix it with 0.05 milliliter of buffer solution so that each of the second set of holes contains 50% serum or a 1:2 dilution ratio. When the loops leave the second set of holes they will carry 0.05 milliliter of 50% solution and mix it with 0.05 milliliter of buffer in the third set of holes. The serum dilution in the third set of holes is now 1:4. The final dilution of 1:16,384 is achieved with the series of two fold dilutions for the 15 rows of holes of the tray.

Simultaneously with making the serial dilutions, the apparatus is used for testing by depositing a known volume of material to be tested into the diluted solutions. This is accomplished by means of the second manifold block 60 which supplies a measured quantity of material to be tested through the hypodermic needles 62 into the row of holes following the row which is being diluted by means of the titration loops 64. For example, at the same time row four is being provided with a fixed amount of buffer solution and row three is being diluted with the liquid carried by the titration loops 64, a known volume of the material to be tested is deposited in the diluted solution in the serond row of holes from the rear manifold block 60. As the machine is sequentially moved from row to row corresponding to the indexing position, the procedure is repeated so that the testing is performed on liquids having a successively larger dilution ratio.

At the end of the 15 holes, the transport assembly 28 is indexed to the flaming assembly 66 by means of the control circuit. At this point gas limit switch 284 is closed and when brush switch 234 completes a circuit through the conductive path on the control disc 230 gas relay 268 is energized. Gas solenoid 264 is in turn energized through gas control relay contact 266 and air and gas are supplied automatically to the burner manifold 196, ignited by the gas pilot 200, and the loops 64 are flamed to incandescence to clean and sterilize them. This removes any protein, virus or bacteria preparatory to running the next test. The loops 64 are than raised and exposed to the blast of air from the air manifold 206 which cools both the loops and keeps the needles 62 containing buffer solution and the testing material cool during the operation. At this end of the cycle the technician manually returns the transport assembly 28 to the first position, puts a new tray in the rack and is now ready to run another testing cycle. The entire sequence of operations to run the serial dilution and test the sera in this manner takes less than four minutes.

Some of the medical tests that the machine will facilitate running are hemagglutination tests for various antibodies, diagnostic complement fixative tests, hemagglutination inhibition tests, tests for assaying viruses and virus neutralization tests.

A specific example of the use of the serial dilution machine is determining the titers of antibody present in the sera of mice immunized with a variety of antigens. For example in testing a drug's effect on the ability of an animal to produce an antibody, the animal is treated with the drug and immunized by it. After a period of immunization, the animal is bled and the serum is obtained. Sera from treated and untreated animals are tested in this machine by placing four control sera and four treated sera in the first series of holes in the trays and preparing the serial dilutions as described above. Testing material is also applied to the diluted solutions, in this case the material being red blood cells coated with the material which was used to immunize the animals. When an antibody is present in the serum, it will cause these coated red blood cells to agglutinate or stick together in the hole in which they have been deposited, forming a recognizable pattern. After the machine performs the dilutions and adds the cells, the tray is stored in a refrigerator overnight and read by examining the patterns of settling of the blood cells. In the absence of an antibody, the red blood cells settle in a first distinctive target pattern while in the presence of antibody they settle in a wholly agglutination pattern.

As indicated above, the serial dilution apparatus may be used manually. The transport mechanism comprising the carriage assembly 48 and loop drive assembly 50 is removed from the machine by merely lifting it off its track. A technician can then use a battery arrangement (not shown) or obtain power from the machine by an extension connected to the plug 85 on the control housing 14 to energize the loop driving motor so that the dilution cycle may be done manually. Furthermore, any number of loops may be removed from the loop drive assembly 50 should a lesser number of dilutions be required.

In the foregoing portions of the specification a method and apparatus have been described for performing serial dilutions to respectively include the step of and means for adding material to be tested to a preceding operating position containing a dilution. While the primary advantages of the present inventions are obtained using such methods and apparatus, significant advantages are also obtained with such testing material step and additional means eliminated. Accordingly the present invention is to be construed broadly to embrace both such concepts and techniques and means for employing them.

The invention may be embodied in other specific forms without departing from the spirit or essential characteristics thereof. The present embodiment and processes are therefore to be considered in all aspects as illustrative and not restrictive, the scope of the invention being indicated by the appended claims rather than the foregoing description, and all the changes which come within the meaning and range of equivalency of the claims are therefore intended to be embraced therein.

I claim:

1. A method of performing serial dilutions of a liquid at a plurality of serially arranged operating positions comprising the simultaneous steps of mixing a predetermined amount of liquid to be diluted into a diluent to form a dilution and collecting an amount of said dilution equal to said predetermined amount at one operating position; simultaneously supplying a predetermined amount of diluent to a subsequent operating position; supplying a predetermined amount of material to be tested to a preceding operating position containing a dilution.

2. Apparatus for performing serial dilutions of a liquid at a plurality of serially arranged operating positions comprising means for mixing a predetermined amount of liquid to be diluted into a diluent to form a dilution and for collecting an amount of said dilution equal to said predetermined amount at one operating position; means for supplying a predetermined amount of diluent to a subsequent operating position; means for supplying a predetermined amount of material to be tested to a preceding operating position containing a dilution and control means being operative to cause said mixing and collecting means, said diluent supplying means and said test material supplying means to operate simultaneously.

3. Apparatus as defined in claim 2 including means for automatically operating said control means; said mixing and collecting means having motor means integral therewith and being removably mounted in said apparatus to permit said mixing and collecting means to be removed from said apparatus and to be operated independently of said apparatus control means.

4. Apparatus as defined in claim 2 wherein said mixing and collecting means, said diluent supplying means and said test material supplying means are all carried by a transport assembly; and means for driving said transport over a tray adapted to contain said dilutions and said diluent.

5. Apparatus as defined in claim 2 wherein said control means is adapted to sequentially operate said serial dilution apparatus through a plurality of operating positions at each of which said mixing and collecting means forms a dilution while said diluent supplying means simultaneously supplies diluent solution to a subsequent operating position and said testing material supplying means simultaneously supplies testing material to a preceding operating position having a previously made dilution therein.

6. Apparatus as defined in claim 5 additionally including logic means for directing the operation of said control means and for rendering inoperative at least one of said mixing and collecting means, said diluent supplying means and said test material supplying means at one or more operating positions.

7. Apparatus as defined in claim 2 additionally including means for cleaning said mixing and collecting means; said cleaning means comprising means for heating said mixing and collecting means; and means for insulating said diluent supplying means and said test material supplying means and their contents from the heat resulting from the operation of said heating means.

8. Apparatus as defined in claim 7 wherein said heating means includes a combustion chamber containing an opening through which said mixing and collecting means can pass; each of said diluent supplying means and said test material supplying means being provided with a liquid outlet portion which is of a configuration such that such liquid outlet portions will be positioned outside of said combustion chamber when said mixing and collecting means has been moved through said opening and into said combustion chamber; and means to project a cooling fluid past said liquid outlet portions and outside of said combustion chamber to cool said portions and their contents while said heating means is operating.

9. Apparatus as defined in claim 8 wherein said heating means comprises means to project a flame in contact with said mixing and collecting means; said cooling fluid projection means being positioned to project said cooling fluid past said liquid outlet portions and across said opening in said combustion chamber so as to create a draft out of said chamber and through said opening; said flame and said mixing and collecting means being positioned sufficiently close to said opening on the inside of said chamber so that said draft will enhance the heating effect of said flame.

10. Apparatus as defined in claim 9 additionally comprising a baffle positioned inside said combustion chamber on the side of said mixing and collecting means remote from said flame projecting means for impeding the flow of fuel projected towards said mixing and collecting means before said fuel is ignited to form said flame so as to facilitate such ignition; said baffle being provided with an opening to permit flame to pass through it so as to direct such flame around said mixing and collecting means.

11. Apparatus as defined in claim 2 wherein said diluent supplying means and said test material supplying means each includes a plurality of liquid outlets each one of which is adapted to deposit liquid at a separate location at a given operating position; means to direct a predetermined quantity of diluent liquid to each liquid outlet of said diluent supplying means; means to direct a predetermined quantity of test material to each liquid outlet of said test material supplying means; said directing means comprising metering pump means for directing a fixed quantity of diluent liquid and test material to said diluent supplying means and said test material supplying means respectively for each cycle of operation of said pump.

12. Apparatus as defined in claim 11 wherein said diluent supplying means and said test material supplying means include mounting means adapted to permit rapid removal and interchangeability with said apparatus.

13. Apparatus as defined in claim 11 wherein said metering pump means comprises a solenoid-operated syringe.

14. Apparatus as defined in claim 11 wherein said diluent and said test material leave their respective liquid outlets by gravity flow; the exit openings of said liquid outlets being of a sufficiently small size to prevent air from entering said liquid outlets between successive withdrawals of liquid therefrom.

15. Apparatus as defined in claim 14 wherein said liquid outlets are hypodermic needles.

16. Apparatus as defined in claim 15 wherein at least one hole is provided in the wall of each of said hypodermic needles at a point near the outlet of each said needle to prevent droplets of liquid from being retained at said outlet.

17. Apparatus as defined in claim 2 wherein said mixing and collecting apparatus comprises a plurality of loops which, when immersed in a liquid, retain a fixed quantity of said liquid primarily through surface effects between said liquid and said loops; said loops being adapted to perform a mixing operation through rotation; and means for rotating said loops.

18. Apparatus for delivering precise equal amounts of liquid to a plurality of receptacles defined in a titration tray and arranged in a plurality of spaced apart rows comprising means defining a liquid manifold, a plurality of spaced apart downwardly directed extensions on said manifold defining passages therein, a hollow needle connected to each of said extensions, spaced apart means supporting said manifold above said receptacles so that said needles extend downwardly toward the receptacles of one of the rows so that upon predetermined relative movement of said support means and said tray each of said needles is positionable above a receptacle of one of said rows, and means for delivering a metered amount of liquid to said manifold so that said needles deliver to each of the receptacles of a row an amount of liquid equal to the metered amount divided by the number of needles.

19. The apparatus of claim 18 further includes a bridging means extending between said support means and supporting said manifold above the tray so that the tray and the support means may be moved relative to each other, said bridging means having apertures along the length thereof to receive the extensions of said manifold.

20. The apparatus of claim 18 wherein said manifolds are so designed and said needles so arranged that the pressure head loss in the defined liquid system is all in said needles.

21. Apparatus for use in conjunction with a titration tray having a plurality of rows of receptacles defined therein, comprising spaced apart upwardly extending support means, a bridging member extending between said support members, said support means being spaced apart to receive a titration tray therebetween, means defining a liquid manifold, a plurality of spaced apart downwardly directed extensions defining passages therein extending from said manifold, said bridging member supporting said manifold over a tray between said support means, a hollow needle connected to each of said extensions so that said needles extend downwardly toward the receptacles of a row in a tray therebelow, means for delivering a metered amount of liquid to said manifold so that each of said needles deliver to each of the receptacles of a row an amount of liquid equal to the metered amount divided by the number of needles.

22. The apparatus of claim 20 further including a plurality of spaced apart titration loops supported by said support means, means for raising and lowering said loops, and means for simultaneously rotating said loops.

23. The apparatus of claim 21, wherein said needles are arranged to have equal liquid pressure losses therein.

24. The apparatus of claim 21 further including means for indexing said support means along the rows of receptacles.

References Cited

UNITED STATES PATENTS

| | | | |
|---|---|---|---|
| 2,624,656 | 1/1953 | Andrews et al. | 23—259 |
| 3,067,016 | 12/1962 | Rozycki | 23—259 |
| 3,127,062 | 3/1964 | Feichtmeir | 23—253 XR |
| 3,188,181 | 6/1965 | Peterson et al. | 23—253 XR |
| 3,191,813 | 6/1965 | Duff | 23—292 XR |
| 3,192,968 | 7/1965 | Baruch et al. | 23—259 XR |
| 3,192,969 | 7/1965 | Baruch et al. | 23—259 XR |
| 3,193,359 | 7/1965 | Baruch et al. | 23—259 XR |
| 3,197,285 | 7/1965 | Rosen | 23—259 XR |
| 3,413,097 | 11/1968 | Jungner | 23—253 XR |
| 3,356,462 | 12/1967 | Cooke et al. | 23—292 |
| 3,269,800 | 8/1966 | Lukrec | 23—253 XR |

MORRIS O. WOLK, Primary Examiner

R. E. SERWIN, Assistant Examiner

U.S. Cl. X.R.

23—253, 259; 73—425.4; 137—87, 109; 141—130, 236, 237; 222—160